US009583083B1

(12) United States Patent
Berlinger

(10) Patent No.: US 9,583,083 B1
(45) Date of Patent: Feb. 28, 2017

(54) ADAPTABLE DRUM PRACTICE DEVICE

(71) Applicant: Elias J. D. N. Berlinger, Escondido, CA (US)

(72) Inventor: Elias J. D. N. Berlinger, Escondido, CA (US)

( * ) Notice: Subject to any disclaimer, the term of this patent is extended or adjusted under 35 U.S.C. 154(b) by 0 days.

(21) Appl. No.: 15/202,948

(22) Filed: Jul. 6, 2016

Related U.S. Application Data

(63) Continuation-in-part of application No. 14/536,421, filed on Nov. 7, 2014, now Pat. No. 9,390,694.

(51) Int. Cl.
*G10D 13/02* (2006.01)

(52) U.S. Cl.
CPC ......... *G10D 13/029* (2013.01); *G10D 13/026* (2013.01)

(58) Field of Classification Search
CPC .......................... G10D 13/029; G10D 13/026
See application file for complete search history.

(56) References Cited

U.S. PATENT DOCUMENTS

| 3,264,926 | A | * | 8/1966 | Belli | G10D 13/029 84/411 R |
| 3,326,074 | A | * | 6/1967 | Osty | G10D 13/029 84/411 R |
| 3,433,115 | A | * | 3/1969 | Kjelstrom | G10D 13/00 84/411 M |
| 4,466,596 | A | * | 8/1984 | Cohen | G10G 5/00 248/231.41 |
| 4,593,596 | A | * | 6/1986 | Gauger | G10D 13/026 84/421 |
| 5,520,090 | A | * | 5/1996 | Eagle | G10D 13/029 84/411 P |
| 5,929,354 | A | * | 7/1999 | Davis | G10D 13/029 84/411 P |
| 5,932,823 | A | * | 8/1999 | Jacobs | G10D 13/029 428/411.1 |
| 6,362,407 | B1 | * | 3/2002 | Dennis | G10D 13/08 84/411 M |
| 6,502,793 | B1 | * | 1/2003 | Sargent | G10D 13/02 248/176.1 |
| 6,525,259 | B2 | * | 2/2003 | Sagastegui | G10D 13/029 84/104 |
| 6,653,540 | B2 | * | 11/2003 | Izen | G10D 13/026 84/327 |

(Continued)

*Primary Examiner* — Robert W Horn
(74) *Attorney, Agent, or Firm* — IDP Patent Services; Olav M. Underdal

(57) ABSTRACT

An adaptable drum practice device includes an attachment mechanism, including a clip or a clamp; a sliding rail; a one-piece or telescoping shaft; and a device practice pad; such that the device practice pad is rotationally connected to the shaft, which allows a drummer to set the device practice pad to preferred height and rotational, vertical, and horizontal angles, and longitudinal position. The adaptable drum practice device can further include a ball joint with a locking mechanism, and the telescoping shaft can further include upper and lower shafts. The adaptable drum practice device allows a practicing drummer to attach the adaptable drum practice device to an existing conventional training drum, quickly and securely, thereby allowing the drummer to have two drumming surfaces that resemble a drum and a hi-hat, cymbal, or additional drum.

11 Claims, 7 Drawing Sheets

(56) References Cited

U.S. PATENT DOCUMENTS

| | | | | |
|---|---|---|---|---|
| 6,815,598 B1* | 11/2004 | Liao | ................... | G10D 13/06 |
| | | | | 84/327 |
| 7,348,479 B1* | 3/2008 | Lombardi | ............ | G10D 13/029 |
| | | | | 84/422.1 |
| 7,638,701 B2* | 12/2009 | May, Jr. | ............... | G10D 13/029 |
| | | | | 84/411 P |
| 7,741,551 B2* | 6/2010 | Mori | ................... | G10D 13/026 |
| | | | | 248/127 |
| 7,777,113 B1* | 8/2010 | Chang | ................ | G10D 13/029 |
| | | | | 84/411 R |
| 7,816,597 B2* | 10/2010 | Okada | ................. | G10D 13/024 |
| | | | | 84/411 R |
| 7,985,908 B1* | 7/2011 | Howard | ............... | G10D 13/029 |
| | | | | 84/411 P |
| 8,403,280 B2* | 3/2013 | Halverson | ............... | H04R 1/08 |
| | | | | 248/228.5 |
| 8,609,970 B2* | 12/2013 | May | ....................... | G10D 13/08 |
| | | | | 84/104 |
| 9,280,959 B2* | 3/2016 | Coheley | ............... | G10D 13/029 |
| 9,286,868 B2* | 3/2016 | Fitzgerald | ............ | G10G 7/00 |
| 9,361,866 B2* | 6/2016 | Mori | .................... | G10D 13/026 |
| 9,390,694 B2* | 7/2016 | Berlinger | ............ | G10D 13/029 |
| 2006/0081116 A1* | 4/2006 | Copeland | ............... | G10D 13/00 |
| | | | | 84/421 |
| 2009/0020677 A1* | 1/2009 | Crous | ..................... | H04R 1/08 |
| | | | | 248/534 |

* cited by examiner

Adaptable Drum Practice Device

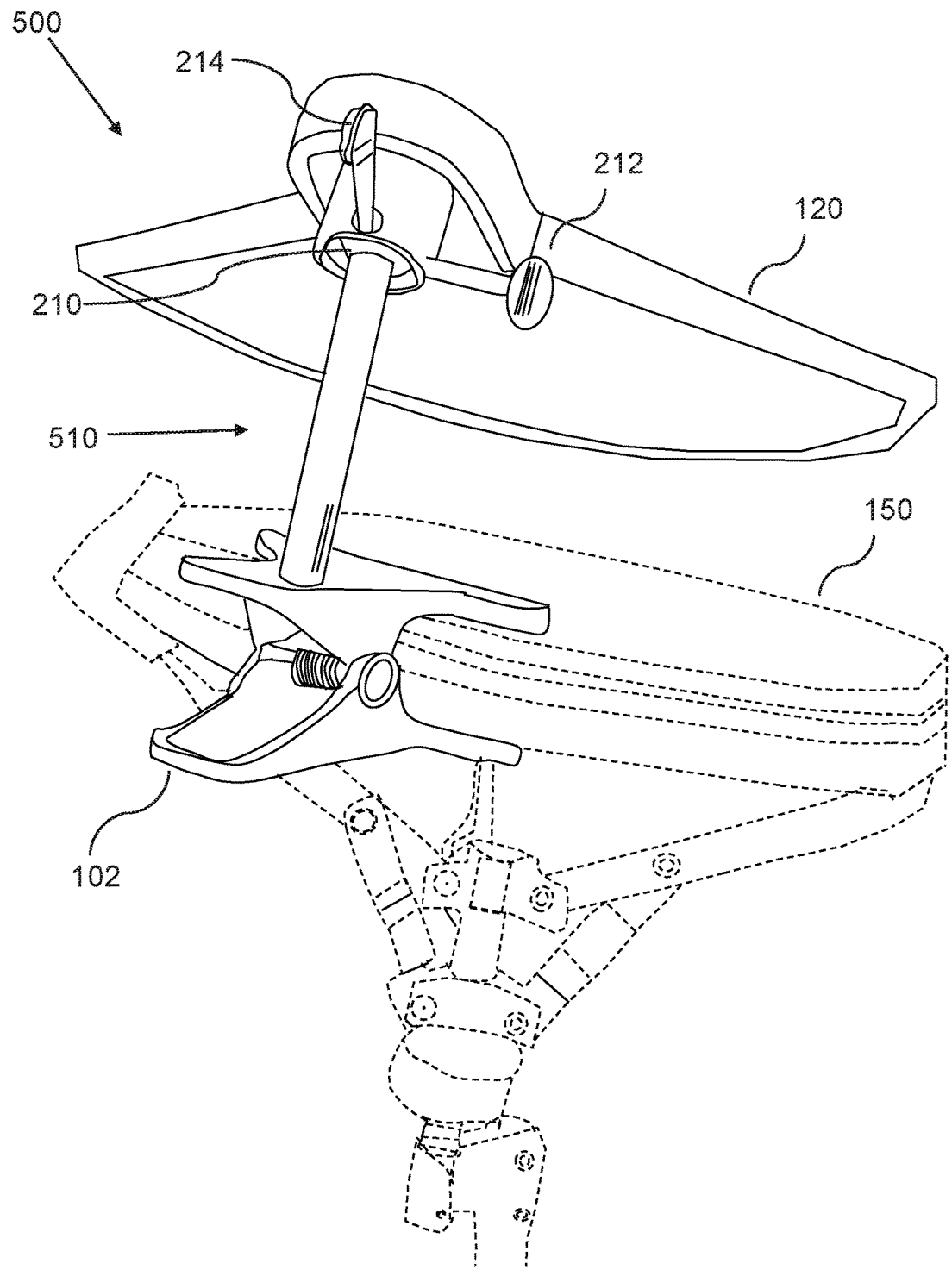

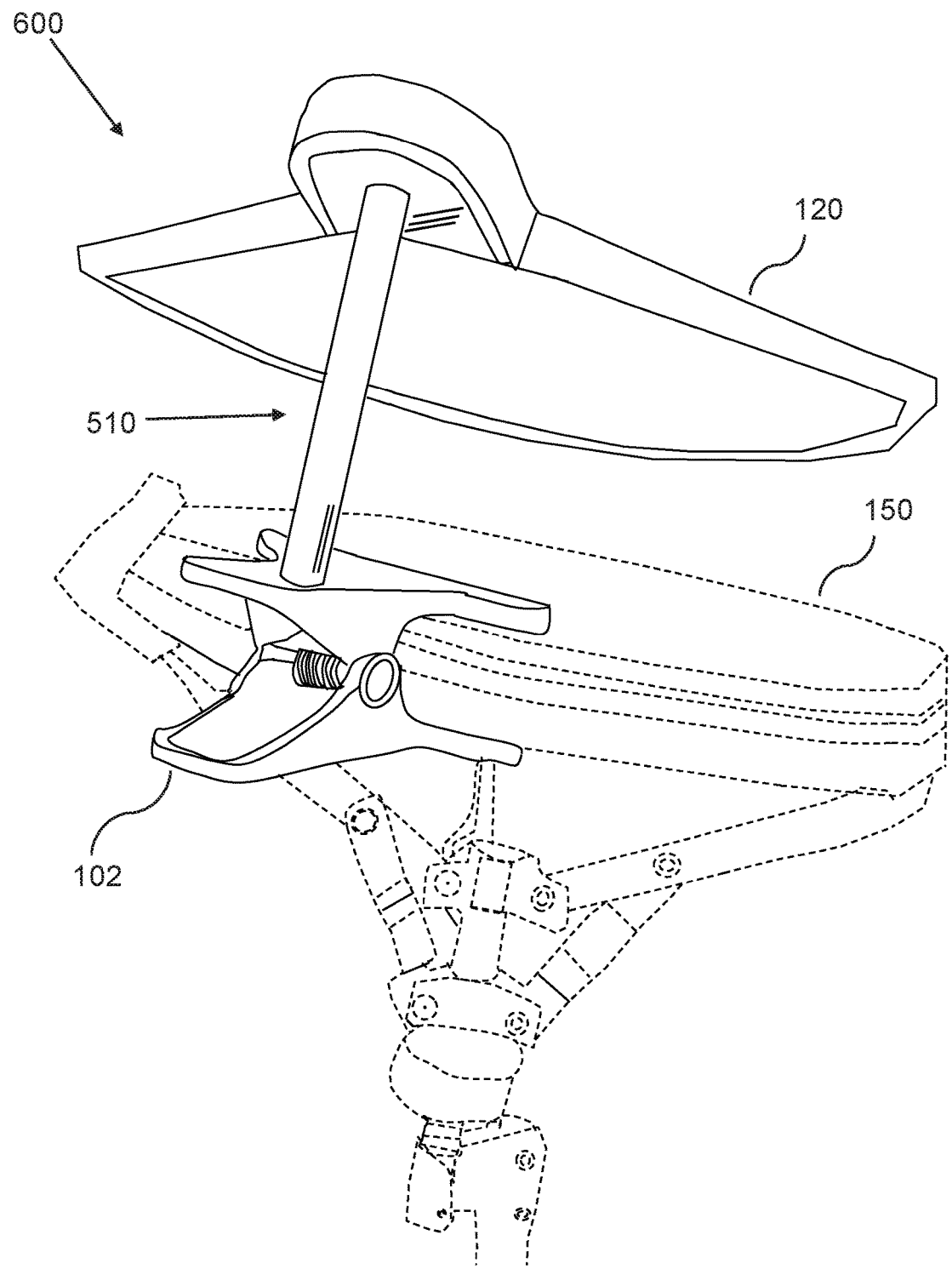

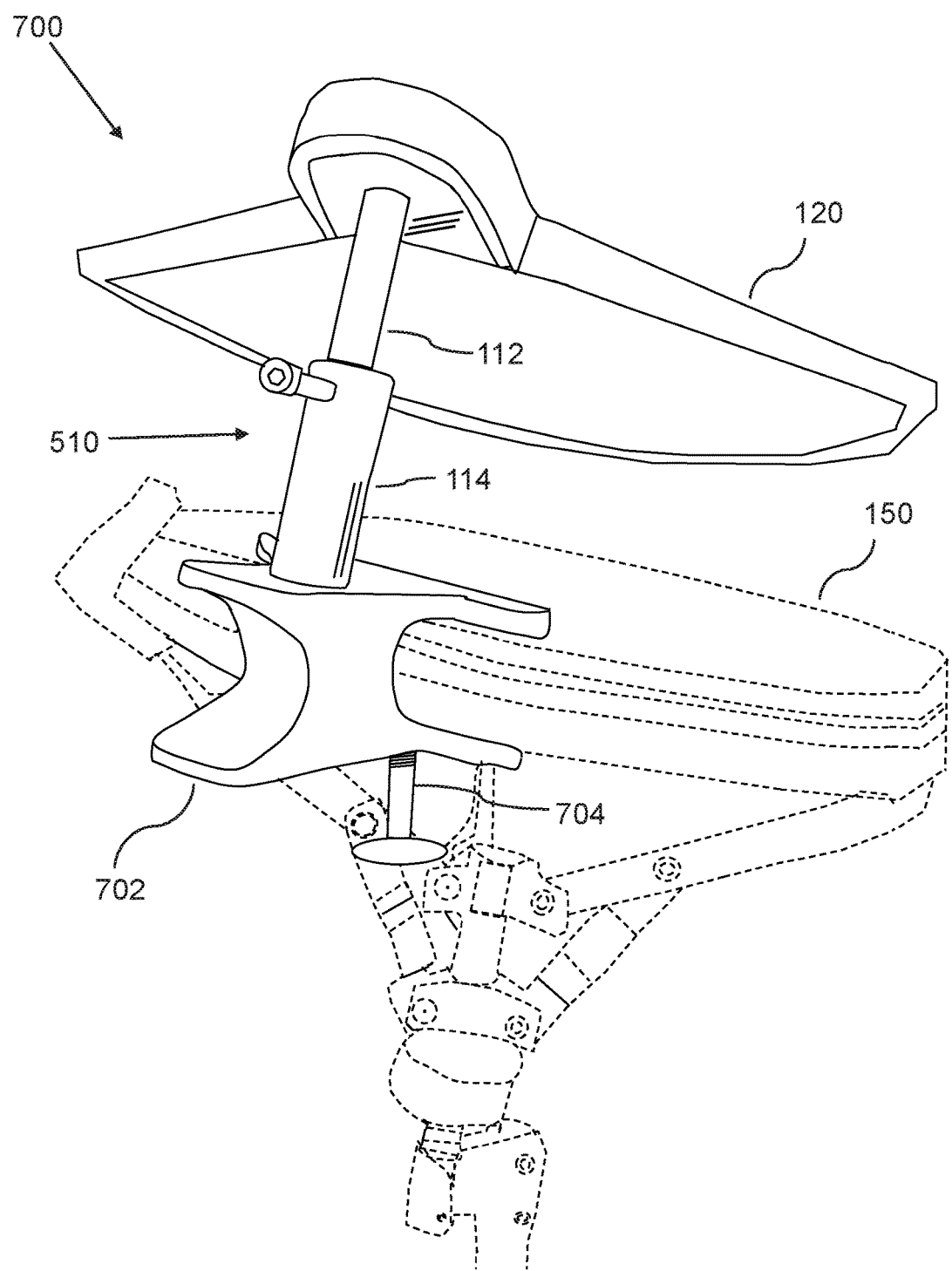

ADAPTABLE DRUM PRACTICE DEVICE

CROSS-REFERENCE TO RELATED APPLICATIONS

This application is a continuation-in-part of U.S. Non-Provisional application Ser. No. 14/536,421, filed Nov. 7, 2014.

FIELD OF THE INVENTION

The present invention relates generally to the field of devices for drumming practice and more particularly to methods, systems and devices related to drum practice pads.

BACKGROUND OF THE INVENTION

Drum practice pads are well known as convenient training equipment for practicing drummers, which can provide a full drumming set-up for use in practice or warm-up, while keeping sound levels at a minimum.

However, existing available practice pads are typically configured as one-level surfaces, or if configurable as a multi-level surface, can only provide a static pre-determined configuration.

Existing devices are therefore not able to replicate normal drum set configurations fully, in the plurality of different configurations that may be preferred by individual drummers.

As such, considering the foregoing, it may be appreciated that there continues to be a need for novel and improved devices and methods for drum practice.

SUMMARY OF THE INVENTION

The foregoing needs are met, to a great extent, by the present invention, wherein in aspects of this invention, enhancements are provided to the existing models for drum practice pads and their configuration.

In an aspect, an adaptable drum practice device for drum practice, can include:
a) an attachment mechanism, configured to attach to a plurality of surfaces and objects;
b) a shaft, which is connected to the attachment mechanism in one end; and
c) a device practice pad, which is rotationally connected to the shaft, such that the device practice pad is adjustable in all dimensions;
whereby the adaptable drum practice device attaches to a main drum practice pad with a preferred angulation and height, for use during drum practice.

In a related aspect, the connection mechanism can be a clip or a clamp.

In a related aspect, the rotational connection of the device practice pad to the shaft can be configured via a ball joint.

In a further related aspect, the ball joint can be lockable.

In a related aspect, the shaft can be a telescoping shaft, which can further include an upper shaft and a lower shaft.

In another related aspect, the telescoping shaft can further include a telescoping lock.

In another aspect, a connection of the shaft to an upper elongated part of the connection mechanism can be longitudinally adjustable, which allows for adjustment of an overlap of the device practice pad with the main drum practice pad.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. In addition, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 5 is a bottom perspective view of an adaptable drum practice device, mounted to a conventional training drum, according to an embodiment of the invention.

FIG. 6 is a bottom perspective view of an adaptable drum practice device, mounted to a conventional training drum, according to an embodiment of the invention.

FIG. 7 is a bottom perspective view of an adaptable drum practice device, mounted to a conventional training drum, according to an embodiment of the invention.

DETAILED DESCRIPTION

Figure 1:
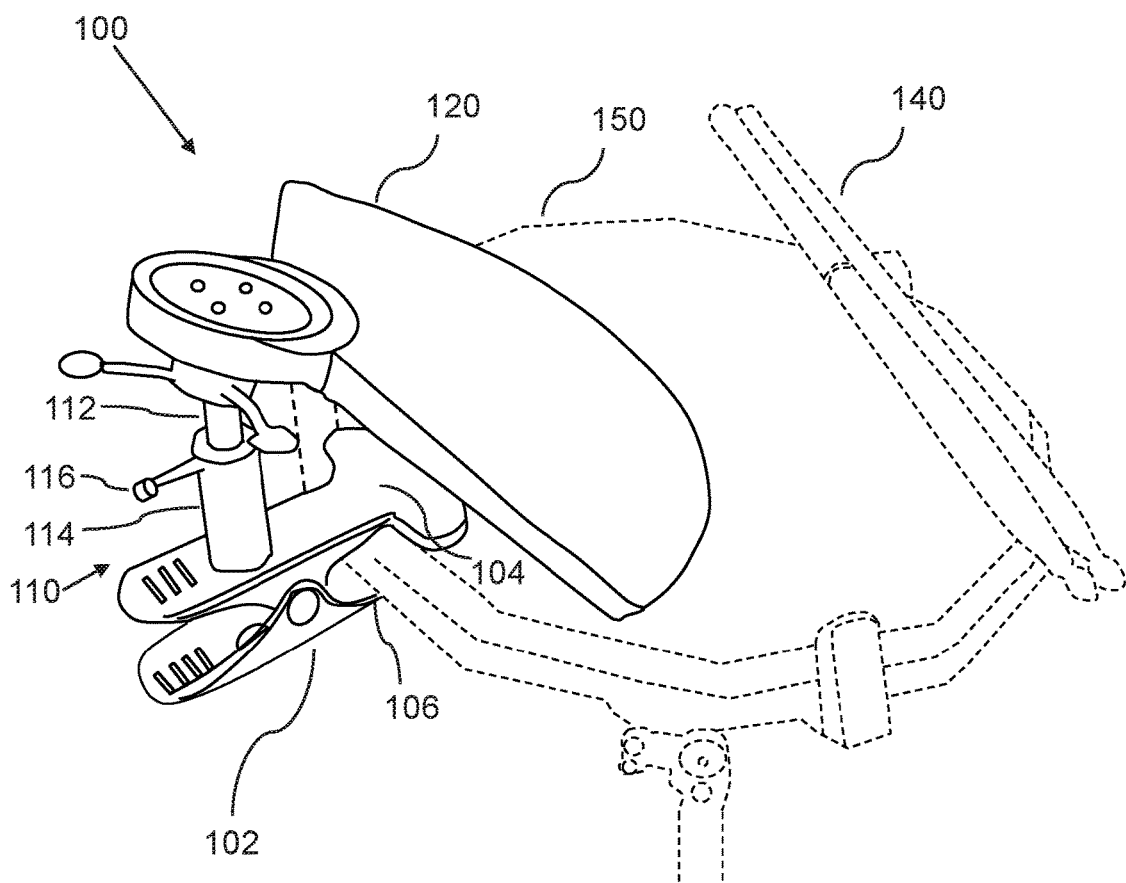
FIG. 1 is a top perspective view of an adaptable drum practice device, mounted to a conventional training drum, according to an embodiment of the invention.

Before describing the invention in detail, it should be observed that the present invention resides primarily in a novel and non-obvious combination of elements and process steps. So as not to obscure the disclosure with details that will readily be apparent to those skilled in the art, certain conventional elements and steps have been presented with lesser detail, while the drawings and specification describe in greater detail other elements and steps pertinent to understanding the invention.

The following embodiments are not intended to define limits as to the structure or method of the invention, but only to provide exemplary constructions. The embodiments are permissive rather than mandatory and illustrative rather than exhaustive.

In the following, we describe the structure of an embodiment of an adaptable drum practice device 100 with reference to FIG. 1, in such manner that like reference numerals refer to like components throughout; a convention that we shall employ for the remainder of this specification.

In an embodiment, an adaptable drum practice device 100 can include:
  a) an attachment mechanism 102, which attaches to a main drum practice pad 150, and is configured to attach to a plurality of surfaces and objects, wherein the attachment mechanism can further include an upper jaw 104 and a lower jaw 106;
  b) a shaft 110, such that a first end of the shaft is connected to the attachment mechanism 102; and
  c) a device practice pad 120; wherein the device practice pad 120 is connected to a second end of the shaft 110; wherein the attachment mechanism 102 is configured to attach on to a side of a main drum practice pad 150, such that the shaft 110 is configured to be substantially perpendicular to a plane of a drum surface of the main drum practice pad 150, when the attachment mechanism 102 is attached onto the main drum practice pad 150;
  whereby the adaptable drum practice device 100 attaches to the main drum practice pad 150 with a preferred angulation for use during drum practice.

In related embodiment, the attachment mechanism 102, can be a clip 102 with inbuilt spring tension, as shown in FIG. 1, or it can be a clamp with a tightening screw, or some other conventional attachment mechanism 102, which allows for easy attachment and removal of an adaptable drum practice device to/from a main drum practice pad 150, or other surfaces or objects. Henceforth, whenever a clip 102 may be mentioned, it shall be understood to also include use of any attachment mechanism 102.

In various related embodiments, the adaptable drum practice device 100 can:
  a) allow drummers to practice using a device resembling a hi-hat cymbal, which is part of most drum sets;
  b) allow a practicing drummer to clip an additional pad to the existing device quickly, securely and easily allowing the drummer to have two surfaces one being a conventional pad (not part of the adaptable drum practice device 100) that resembles a drum and another raised pad that resembles a hi-hat or cymbal. The adaptable drum practice device 100 can also be slightly modified to resemble another drum rather than a cymbal.
  c) allow configurations of a practice drum, which is much closer to what drummers experience when playing a conventional drum set
  d) allow drummers to practice using a practice pad in order to play quietly rather than playing loud drums.

In a related embodiment, the adaptable drum practice device 100 can be configured to resemble another drum, rather than a cymbal or hi-hat.

FIG. 1 shows an embodiment wherein the adaptable drum practice device 100 is configured with a shape that is substantially a wedge or a circular sector. In various related embodiments, the device practice pad 120 can be configured in a plurality of different shapes, including full circular shapes to resemble a cymbal or drum.

In a related embodiment, the attachment mechanism 102 can attach to an existing practice pad, such as a main drum practice pad 150, or a regular drum or drumming related device, which can all be in a plurality of different sizes and shapes. The attachment mechanism 102 can also attach to other objects and surfaces, as desired by a drummer during a practice session.

In a related embodiment, such as shown in FIG. 1, the shaft can be telescoping, such that the shaft 110 further comprises an upper shaft 112 and a lower shaft 114, such that the upper shaft 112 slides inside the lower shaft 114, whereby the length of the shaft 110 can be adjusted to a preference of a drummer using the adaptable drum practice device 100. The shaft 110 can further include a telescoping lock 116, which for example can be a screw or lever that locks the position of the upper and lower shafts 112 114 to a preferred length of the shaft 110.

Figure 2:
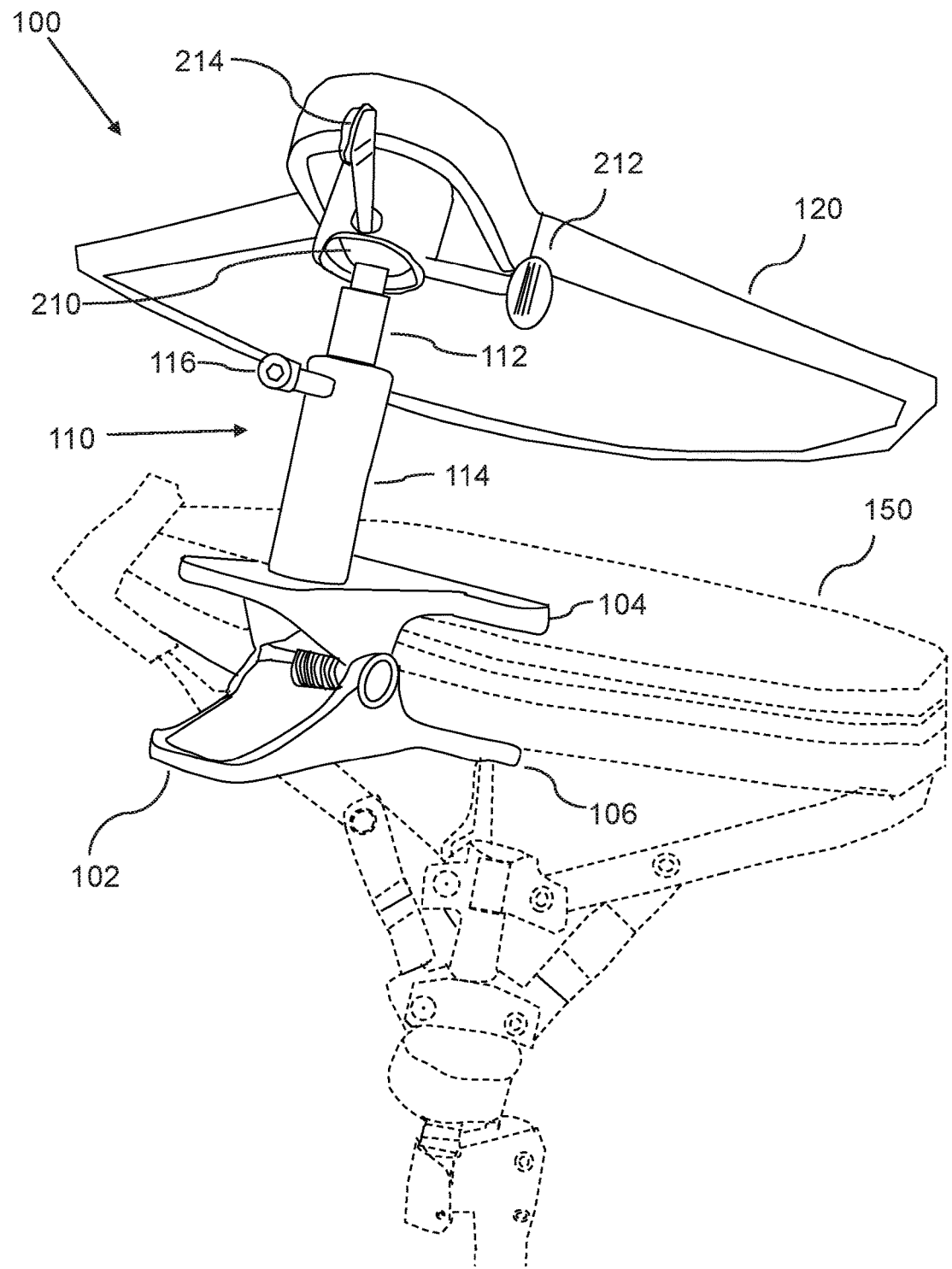
FIG. 2 is a bottom perspective view of an adaptable drum practice device, mounted to a conventional training drum, according to an embodiment of the invention.

In a related embodiment, shown in FIG. 2, the device practice pad 120 can be rotationally connected to the shaft 110, via a ball joint 210. The ball joint 210 can be lockable via a locking mechanism 212, which can be an adjustable lock screw 212, and can further comprise an adjustment lever 214, whereby the device practice pad 120 can be adjusted to preferred rotational, vertical and horizontal angles.

In use, embodiments of the adaptable drum practice device 100 are intended to be struck by a drumstick 140 during practice, thereby emulating the action and feel of playing the main parts of a conventional drum set.

In related embodiments, the device practice pad 120 can be constructed according to conventional design principles that are well known in the art for practice pads, including lightweight designs with a rubberized surface.

In related embodiments, the attachment mechanism 102 can be constructed from metal, metal alloys, plastic, plastic composites, glass fiber, carbon fiber, wood, other suitable materials, and combinations thereof.

In related embodiments, the shaft 110 can be constructed from metal, metal alloys, plastic, plastic composites, glass fiber, carbon fiber, wood, other suitable materials, and combinations thereof. In related example embodiments, the upper and lower shaft 112 114 can be manufactured in machined stainless steel or an aluminum alloy.

Figure 3:
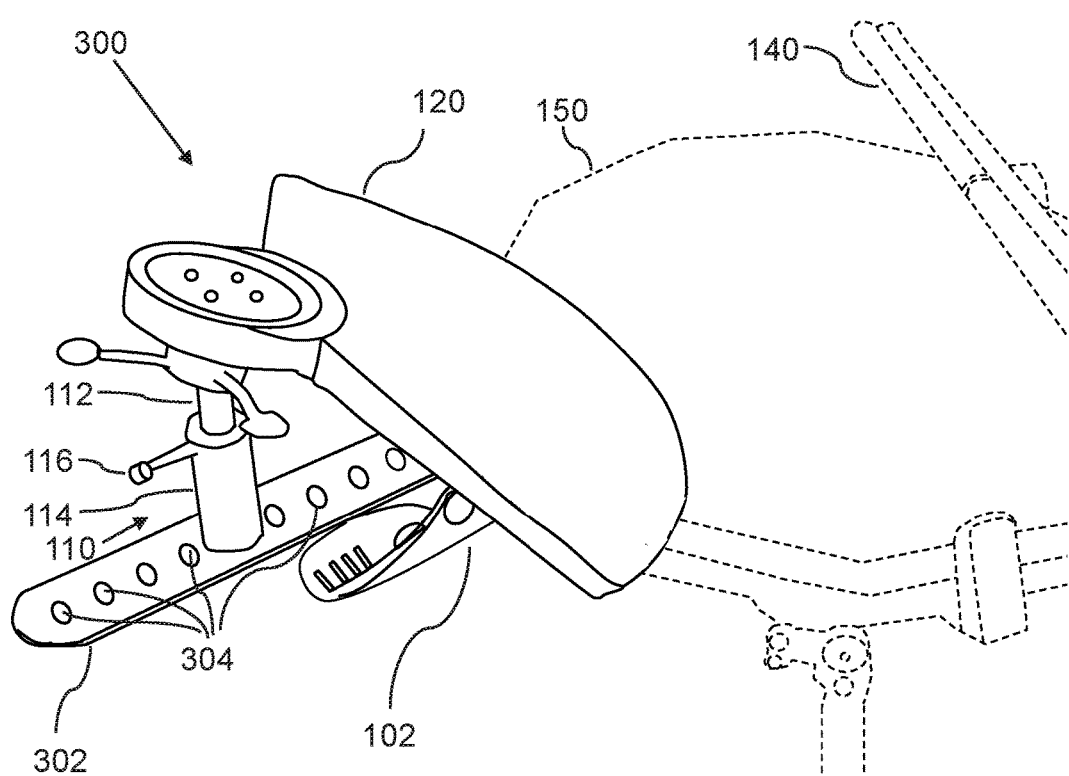
FIG. 3 is a top perspective view of an adaptable drum practice device, mounted to a conventional training drum, according to an embodiment of the invention.

In an embodiment, as shown in FIG. 3, of an adaptable drum practice device 300, a connection of the shaft 110 to an upper elongated part 302 of the attachment mechanism 102, can be longitudinally adjustable, whereby an overlap of the device practice pad 120 with a main practice pad 150 can be adjusted.

In a related embodiment, the upper elongated part 302 can further include notches 304, which allow a shaft 110 to be connected in a selected notch 304, to adjust the longitudinal position of the connection of the shaft 110 to the attachment mechanism 102. The connection can for example be tightened from underneath with a tightening screw (not visible in FIG. 3).

Figure 4:
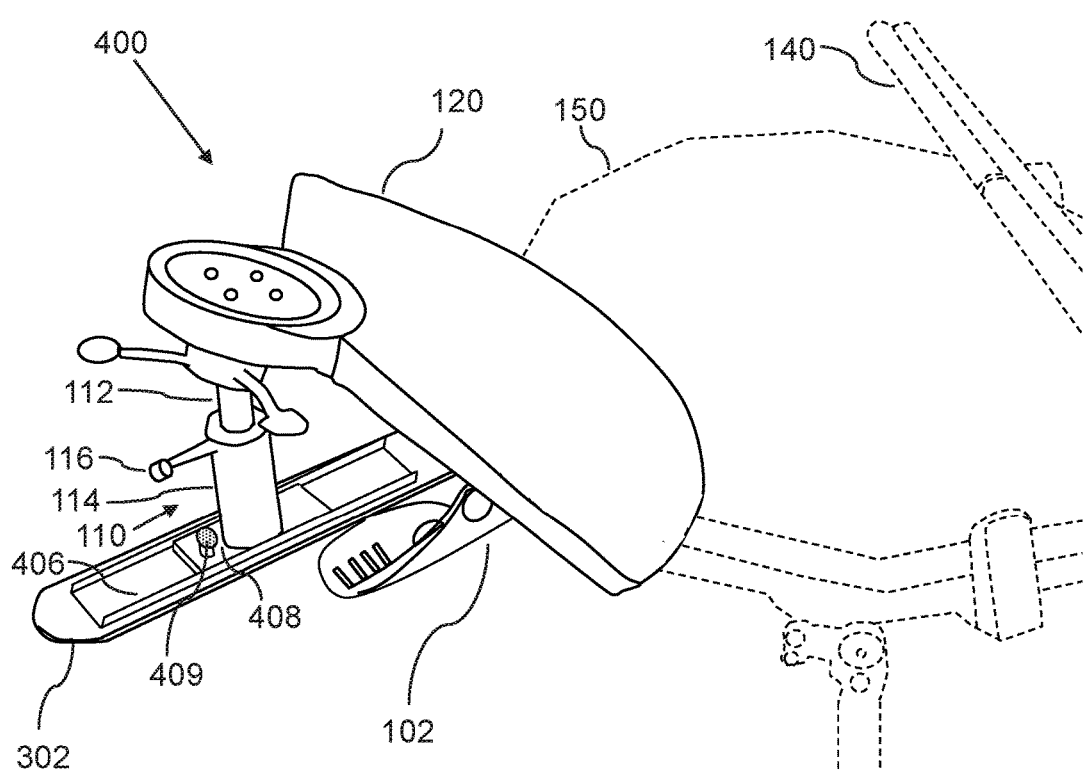
FIG. 4 is a top perspective view of an adaptable drum practice device, mounted to a conventional training drum, according to an embodiment of the invention.

In a related embodiment, as shown in FIG. 4, of an adaptable drum practice device 400, the upper elongated part 302 of the attachment mechanism 102, can further include a sliding rail 406, mounted in the longitudinal direction of the upper elongated part, such that a lower end 408, or base 408, of the shaft 110 can slide along, in, or on, the sliding rail 406, such that the connection of the shaft 110 to the attachment mechanism 102 is longitudinally adjustable, whereby an overlap of the device practice pad 120 with a main practice pad 150 can be adjusted.

In a further related embodiment, the lower end 408, or base 408, can further include a fastening screw 409, which can secure the lower end 408 in a selected position in, or on, the sliding rail 406.

In various further related embodiments, the design of the sliding rail 406 can be implemented according to the various design principles that are well known in the art for sliding rails. The sliding rail 406 can for example be a monorail, such that the lower end 408, or base 408, of the shaft 110 wraps around, or is connected on, the monorail, rather than as shown on FIG. 4, inside the sliding rail 406.

In an embodiment, as shown in FIG. 5, an adaptable drum practice device 500 can be configured with a shaft 510, which is configured as a one-piece shaft 510, such that the shaft 510, is a non-telescoping shaft 510, with a fixed length.

In an embodiment, as shown in FIG. 6, an adaptable drum practice device 600 can be configured with a fixed connection between the device practice pad 120 and the upper end of the shaft 110 510, such that the fixed connection is not rotational or moveable, whereby the adaptable drum practice device 600 attaches to a main drum practice pad 150 with a fixed angulation for use during drum practice.

In related embodiments, a connection between the device practice pad 120 and the upper end of the shaft 110 510 can be a limited rotational connection, such that rotation is limited to the horizontal or the vertical plane, or limited to some other plane or envelope of rotation or movement.

In an embodiment, as shown in FIG. 7, an adaptable drum practice device 700 can be configured such that the attachment mechanism 702 is a clamp 702, which further can include a clamp screw 704.

The many features and advantages of the invention are apparent from the detailed specification, and thus, it is intended by the appended claims to cover all such features and advantages of the invention, which fall within the true spirit and scope of the invention.

Many such alternative configurations are readily apparent, and should be considered fully included in this specification and the claims appended hereto. Accordingly, since numerous modifications and variations will readily occur to those skilled in the art, it is not desired to limit the invention to the exact construction and operation illustrated and described, and thus, all suitable modifications and equivalents may be resorted to, falling within the scope of the invention.

What is claimed is:

1. An adaptable drum practice device, comprising:
   a) an attachment mechanism, configured to attach to a plurality of surfaces and objects, wherein the attachment mechanism further comprises an upper jaw and a lower jaw;
   b) a shaft, such that a first end of the shaft is connected to the upper jaw of the attachment mechanism; and
   c) a device practice pad, wherein the device practice pad is connected to a second end of the shaft;
   wherein the shaft is configured as a one-piece shaft;
   wherein the attachment mechanism is selected from the group consisting of a clip and a clamp;
   wherein the attachment mechanism is configured to attach on to a side of a main drum practice pad, such that the shaft is configured to be substantially perpendicular to a plane of a drum surface of the main drum practice pad, when the attachment mechanism is attached onto the main drum practice pad;
   whereby the adaptable drum practice device attaches to the main drum practice pad with a preferred angulation for use during drum practice.

2. The adaptable drum practice device of claim 1, wherein the attachment mechanism is a clip.

3. The adaptable drum practice device of claim 1, wherein the connection between the device practice pad and the second end of the shaft is a fixed connection.

4. The adaptable drum practice device of claim 1, wherein the connection between the device practice pad and the second end of the shaft is a rotational connection, such that the device practice pad is adjustable to selected rotational, vertical, and horizontal angles.

5. The adaptable drum practice device of claim 4, wherein the rotational connection of the device practice pad to the second end of the shaft is configured via a ball joint.

6. The adaptable drum practice device of claim 5, wherein the ball joint further comprises a locking mechanism, such that the ball joint is lockable.

7. An adaptable drum practice device, comprising:
   a) an attachment mechanism, configured to attach to a plurality of surfaces and objects, wherein the attachment mechanism further comprises an upper jaw and a lower jaw;
   b) a shaft, such that a first end of the shaft is connected to the upper jaw of the attachment mechanism; and
   c) a device practice pad, wherein the device practice pad is connected to a second end of the shaft;
   wherein the connection between the device practice pad and the second end of the shaft is a fixed connection;
   wherein the attachment mechanism is selected from the group consisting of a clip and a clamp;
   wherein the attachment mechanism is configured to attach on to a side of a main drum practice pad, such that the shaft is configured to be substantially perpendicular to a plane of a drum surface of the main drum practice pad, when the attachment mechanism is attached onto the main drum practice pad;
   whereby the adaptable drum practice device attaches to a main drum practice pad with a fixed angulation for use during drum practice.

8. The adaptable drum practice device of claim 7, wherein the attachment mechanism is a clip.

9. The adaptable drum practice device of claim 7, wherein the shaft is further configured as a telescoping shaft.

10. The adaptable drum practice device of claim 9, wherein the telescoping shaft further comprises an upper shaft and a lower shaft, such that the upper shaft slides inside the lower shaft.

11. The adaptable drum practice device of claim 9, wherein the telescoping shaft further comprises a telescoping lock, which is configured to lock the telescoping shaft to a preferred length.

* * * * *